No. 758,439. PATENTED APR. 26, 1904.
G. A. GRIGGS.
INKSTAND.
APPLICATION FILED DEC. 29, 1903.
NO MODEL.
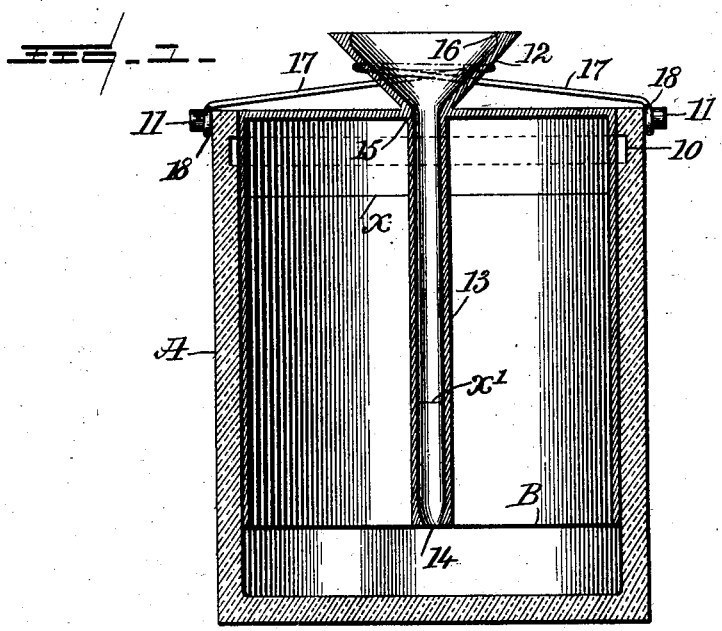
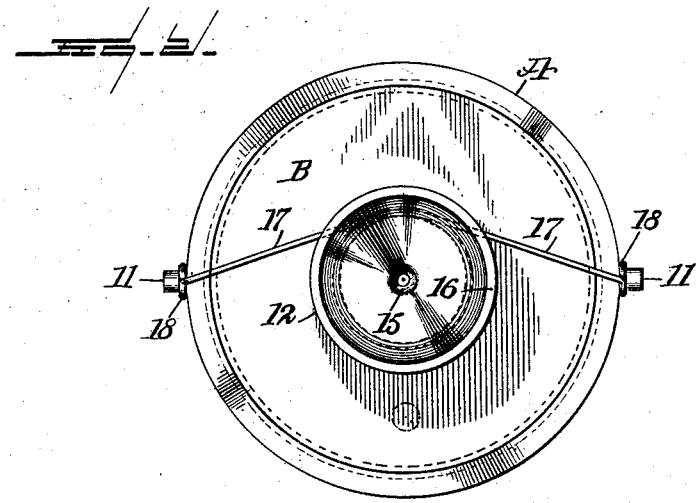
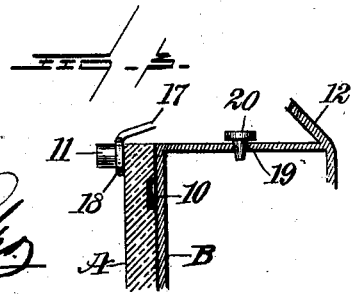
WITNESSES:
INVENTOR
George Albert Griggs
BY
ATTORNEYS No. 758,439. Patented April 26, 1904.

UNITED STATES PATENT OFFICE.

GEORGE ALBERT GRIGGS, OF BILLINGS, MONTANA.

INKSTAND.

SPECIFICATION forming part of Letters Patent No. 758,439, dated April 26, 1904.

Application filed December 29, 1903. Serial No. 186,996. (No model.)

*To all whom it may concern:*

Be it known that I, GEORGE ALBERT GRIGGS, a citizen of the United States, and a resident of Billings, in the county of Yellowstone and State of Montana, have invented a new and Improved Inkstand, of which the following is a full, clear, and exact description.

The purpose of the invention is to provide an inkstand of that type in which the feed-funnel is employed to supply ink to the pen-nib, the funnel being depressed at each dipping operation of the pen, and to construct such an inkstand in a simple, durable, and economic manner and so that it will be reliable under all conditions of temperature and so that the ink-chamber is fully open at the bottom and practically closed at the top, being reversed when filled, which filling operation can be expeditiously and cleanly accomplished, and also to so construct the inkstand that in use the ink will not overflow therefrom.

A further purpose of the invention is to provide an inkstand of the character described which will consist practically of two elements, a body in the form of a well and a tension-controlled ink-chamber which operates in the well and carries a preferably integral funnel for supplying the fluid to the pen-nib.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a vertical central section through the improved inkstand. Fig. 2 is a plan view thereof; and Fig. 3 is a vertical section through a part of the upper portion of the inkstand, illustrating a slight departure in the construction of the same.

A represents the body of the inkstand, which is in the form of a well and is preferably made of glass, porcelain, or the like, although any suitable material may be employed. This well-body A is circular in cross-section and is open at the top, being provided in its inner face near its upper edge with an annular channel 10, and the said well at its upper edge is also provided with horizontal lugs 11, located at opposite sides and in horizontal alinement.

B represents what I term an "ink-chamber," and this ink-chamber B is open at the bottom and is closed at the top and is of less vertical dimensions than the corresponding dimensions of the well A. This ink-chamber B, which is preferably made of hard rubber, is filled at its bottom, the chamber being reversed at such time, and the walls of the said ink-chamber B at their outer faces are made to more or less snugly fit the inner wall of the well A; but the engagement between the said two elements A and B is such that the ink-chamber B may be moved upward and downward in the well A.

A funnel 12 is located at the central portion of the top of the ink-chamber B, and this funnel extends through the said top and is integral with a tubular stem or shank 13. This tubular stem or shank 13 extends to the bottom of the ink-chamber B, and its outlet 14 is contracted, but is gradually enlarged as it approaches the main bore of the shank or stem 13, whereby the inner wall of the shank or stem 13 of the funnel at the outlet end of the stem is more or less concaved, as is fully shown in Fig. 1.

Where the shank 13 connects with the funnel 12, the inner wall is rounded off to a greater or less extent, as is shown at 15 in Fig. 1, and the upper portion of the funnel is made interiorly thicker than the other portions thereof, so as to form substantially an inwardly-extending overhanging annular rib 16, so as to cause the ink if accidentally rushed upward too rapidly, and thereby suddenly brought into contact with said rib, to be deflected inwardly thereby toward the center of the funnel.

A spring 17, of any suitable material, is coiled around the funnel 12, and the ends of the spring are made to extend in opposite directions and terminate in eyes 18, adapted to receive the lugs 11 at the upper end portion of the well A. In Fig. 3 I have illustrated a slight difference in the construction of the ink-chamber B, wherein it is possible to fill the said chamber without reversing it, and to such an end an aperture 19 is made in the upper closed end or head of the said chamber B, normally closed usually by a tapering plug 20; but the construction which is shown in Figs. 1 and 2 is that which is preferred.

Under the construction shown in Figs. 1 and 2 when it is desired to fill the inkstand the ink-chamber B is withdrawn from the well A, the spring 17 having been previously released from the well. The ink-chamber is then reversed and is filled through its open bottom, and while the ink-chamber is in this position the well A is reversed and slid over the said chamber until the bottom portions of the two elements are in close engagement, and the spring 17 is at such time again connected with the well. The inkstand is now restored to its normal position upon the support, and said spring 17 will draw the ink-chamber upward to the position shown in Fig. 1, leaving a space in the well below the bottom portion of the ink-chamber and a partial vacuum-space in the said chamber between the upper surface of the fluid and the top of the chamber, and the level of the ink in the chamber will be practically at the line $x$, (shown in Fig. 1,) and the level of the ink in the stem, feed-tube, or shank of the funnel 12 will be at or about the line $x'$. (Also shown in Fig. 1.)

When it is desired to take ink from the inkstand, the pen-nib is pressed down in the funnel 12, and such pressure carries the ink-chamber B downward and raises the column of ink in the shank or feed-tube of the funnel to meet the pen-nib; but the ink will not ordinarily tend to overflow at the top of the funnel, due to the fact that the spring 17 limits the downward movement of the ink-chamber B and returns the same to its normal position as soon as the pen is withdrawn. The spring 17 not only reduces the shock in too sudden dipping of the pen, thus lessening the tendency to force the ink up too suddenly, but also prevents the ink-chamber from being carelessly lifted out from the well A. The spring 17 need not be adjusted after having been placed upon the lugs 11 of the well A. The concaved wall at the outlet 14 of the said feed tube or shank of the funnel allows the ink to spread out in a horizontal direction while ascending the said feed tube or shank, thus tending to prevent the ink from rising too suddenly in the tube or shank and the consequent liability of the ink gushing over the top of the funnel. A further prevention of overflow of ink at the funnel lies in the groove 10 in the inner face of the well, which groove serves to take up the surplus ink when forced between the walls of the ink-chamber and the well.

It has been found advantageous in practice to introduce a drop or two of machine-oil at the annular groove 10, which oil will float at the top of the ink, thus preventing evaporation. It also causes the ink to adhere to the opposing sides of the ink-chamber and the well and prevents corrosion, so that ink will not gather on said parts. The oil is not at all liable to sink in the ink. If, perchance, it did, it would affect the ink only in a small way, as only a slight trace would be present, and the particles in such event would gather on the pen and would prevent the pen from corroding.

Having thus described my invention, I claim as new and desire to secure by Letters Patent—

1. An inkstand, consisting of a well open at the top, an ink-receiving chamber mounted to slide in the well and normally extending from about the top thereof to a point short of the bottom thereof, open at its bottom and closed at its top, and a funnel provided with a tubular shank, which tubular shank extends from the top of the said chamber to the bottom thereof, as described.

2. An inkstand, consisting of a well open at the top and closed at the bottom, a reversible ink-chamber mounted to slide in the said well, being removable therefrom and of less depth than the depth of the well, the said chamber being open at the bottom and closed at the top, said top being normally held about the top of the ink-well and a funnel introduced at the top of the said chamber, which funnel is provided with a feed-tube extending from the top to the bottom of the ink-chamber, the bore of the said feed-tube being gradually contracted at its bottom end, as set forth.

3. An inkstand, consisting of a well open at the top and closed at the bottom, a reversible ink-chamber mounted to slide in the said well, being removable therefrom and of less depth than the depth of the well, the said chamber being open at the bottom and closed at the top, a funnel introduced at the top of the said chamber, which funnel is provided with a feed-tube extending from the top to the bottom of the ink-chamber, the bore of the said feed-tube extending from the top to the bottom of the ink-chamber, and being gradually contracted at its bottom end, and a spring having bearing on the funnel and yieldingly supporting the ink-chamber in an approximately constant position, as specified.

4. In an inkstand, a well provided with an annular groove in its inner face near its upper end and exterior lugs extending from opposite sides of the well, which well is closed at its bottom and open at its top, an ink-chamber closed at the top and open at the bottom, being removably mounted to slide in the well, the said ink-chamber being of less depth than the depth of the well and normally held with its top at the top of the well, a funnel located at the upper end of the said ink-chamber, which funnel has an inwardly-curving annular rib at its upper edge, a feed-tube connected with the funnel and extending the length of the said ink-chamber, the bore of the feed-tube being gradually contracted at its lower end, and a spring designed to exert a lifting tendency on the said ink-chamber, the terminals of which spring are fitted for removable engagement with the lugs on the well, as set forth.

In testimony whereof I have signed my name to this specification in the presence of two subscribing witnesses.

GEORGE ALBERT GRIGGS.

Witnesses:
 EUGENE HERBERT HOLLISTER,
 JAMES HENRY McELROY.